United States Patent
Greene

[11] 3,893,484
[45] July 8, 1975

[54] CYLINDER AND PISTON VALVE

[75] Inventor: James Thomas Greene, Salem, N.H.

[73] Assignee: Sanders Associates, Inc., Nashua, N.H.

[22] Filed: July 27, 1973

[21] Appl. No.: 383,367

[52] U.S. Cl. .................... 137/625.65; 137/596.17
[51] Int. Cl. ... F15b 13/02; F15b 5/00; F16k 11/07; F16k 11/10
[58] Field of Search..... 137/625.65, 625.61, 625.69, 137/625.62, 596.16, 609, 596.17

[56] References Cited
UNITED STATES PATENTS

| | | | |
|---|---|---|---|
| 2,933,106 | 4/1960 | Gerwig et al. | 137/625.62 |
| 3,223,104 | 12/1965 | Cox et al. | 137/625.62 X |
| 3,357,444 | 12/1967 | Zeuner | 137/625.62 X |
| 3,554,211 | 1/1971 | Bernstein | 137/625.62 X |
| 3,592,234 | 7/1971 | Baltus | 137/625.62 |
| 3,742,980 | 7/1973 | Byers, Jr. | 137/625.62 |

FOREIGN PATENTS OR APPLICATIONS

| | | | |
|---|---|---|---|
| 4,323,599 | 3/1964 | Japan | 137/625.62 |
| 4,518,902 | 6/1965 | Japan | 137/596.17 |

*Primary Examiner*—Martin P. Schwadron
*Assistant Examiner*—Robert J. Miller
*Attorney, Agent, or Firm*—Louis Etlinger

[57] ABSTRACT

A cylinder and piston valve including first and second pistons resiliently urged into engagement with the actuating arm of a torque motor. The valve also includes first and second valve sleeves between the pistons and the valve body and each sleeve is axially adjustable, whereby the neutral position and the amount of dead space may be selected and compensation for wear made at any time.

5 Claims, 1 Drawing Figure

PATENTED JUL 8 1975　　　　　　　　　　　　3,893,484
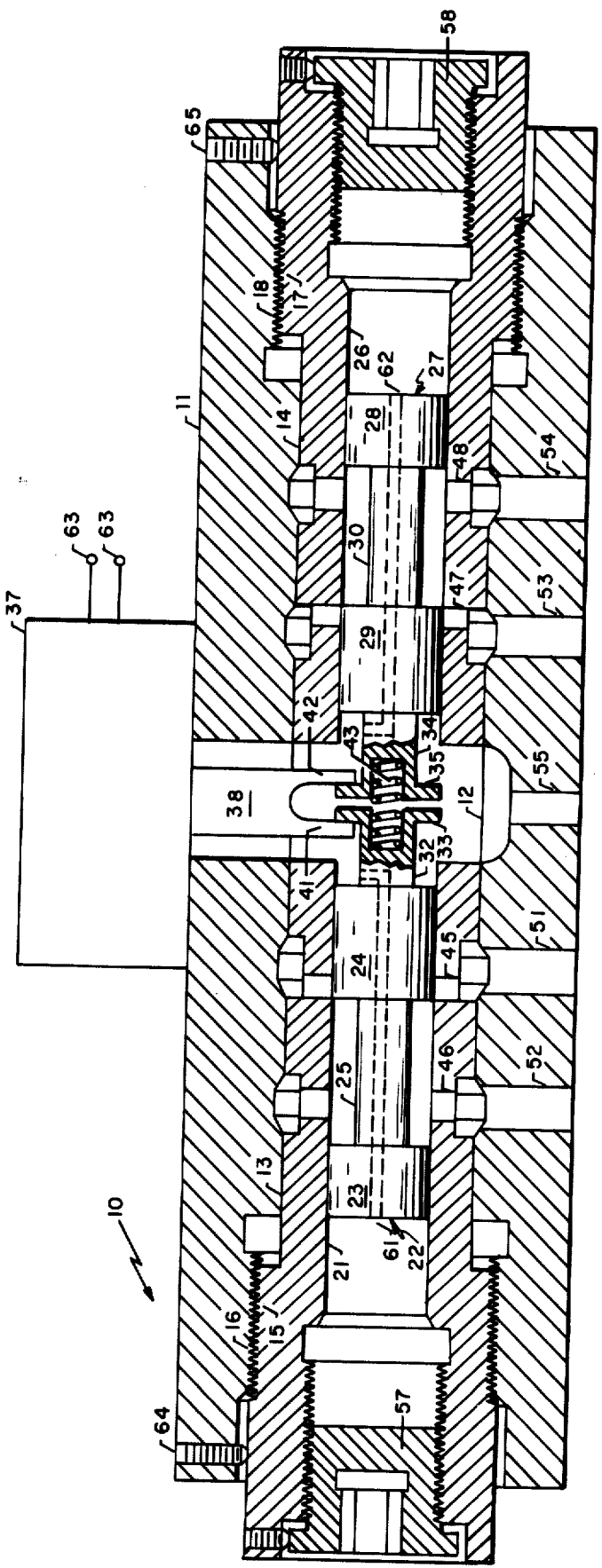

3,893,484

CYLINDER AND PISTON VALVE

FIELD OF THE INVENTION

This invention relates generally to hydraulic systems and particularly to a cylinder and piston valve system suitable for use as the first or pilot stage of a multistage valve system.

BACKGROUND OF THE INVENTION

A typical multistage hydraulic valve system includes a first, or pilot, stage responsive to an input signal for establishing a fluid control pressure or pressures or a rate of fluid flow which is used to control the position of a second stage, or main, valve which in turn directly controls the flow of fluid to a useful load device such as a hydraulic motor. The first stage of such a system may comprise any of the various types of valves such as a nozzle and flapper type, in which a flapper is positioned by an input signal so as to differentially restrict the flow of fluid through a pair of nozzles, or a cylinder and piston type of valve in which an input signal displaces the piston from a reference position in one direction or another so as to admit more fluid under pressure to one or another of a pair of passageways. The flapper and nozzle type of valve is frequently preferred because it is usually less expensive to manufacture and easier to adjust for zero output in the absence of an input signal. However, the flapper and nozzle valve has one serious disadvantage in that it exhibits a great deal of leakage, that is, a relatively large amount of fluid is used even in the absence of an input signal. On the other hand, the cylinder and piston valves have been relatively expensive to manufacture because of the rigid tolerances required to be maintained in order to establish a neutral or reference position at which the controlled passageways are subjected to identical conditions in the absence of an input signal. Typically in such valves, the reference position and also the amount of "dead space" is established during manufacture and cannot be adjusted readily thereafter. Another source of expense in the cylinder and piston valve, when used as a first stage valve, is the need to provide either a force motor, which inherently delivers a linear output motion or, if a torque motor is used, to provide a coupling mechanism which is both free enough to avoid binding yet tight enough to avoid backlash.

It is a general object of the present invention to provide an improved hydraulic valve.

A more specific object is to provide an improved cylinder and piston valve which is comparatively inexpensive to manufacture and in which the neutral position and the amount of dead space can be adjusted readily.

SUMMARY OF THE INVENTION

Briefly stated, a valve system incorporating the present invention includes first and second opposed pistons both spring biased into engagement with the actuating arm of a torque motor thereby eliminating backlash while allowing lateral slippage so as to prevent binding. Null and dead space adjustments are provided by first and second sleeves interposed between the pistons and the valve body, each mounted to the valve body so as to be axially adjustable. The valve body and the sleeves have the usual passageways to provide communication between the interior of the sleeves and the exterior of the valve body, and the pistons have the usual lands cooperating with these passageways so as to establish the desired fluid connections as each is displaced from its reference position. Since each sleeve is axially adjustable both the neutral position and the amount of dead space can be adjusted at any time to accommodate different operating conditions or to compensate for wear.

BRIEF DESCRIPTION OF THE DRAWING

For a clearer understanding of the invention, reference may be made to the following detailed description and the accompanying drawing the single FIGURE of which is a schematic cross section view of a preferred embodiment of the invention.

DESCRIPTION OF PREFERRED EMBODIMENT

Referring now to the drawing there is shown a valve housing indicated generally by the reference character 10. The expression "housing" is intended to include the valve body, manifolds, sleeves, end caps, etc., enclosing and supporting the various parts. More specifically, there is shown a valve body 11 formed to define a generally cylindrical bore 12 extending completely therethrough. Sleeves 13 and 14, each having a generally cylindrical outer surface, are disposed in opposite ends of the bore with their outer surfaces in engagement with the interior surface of the bore. The sleeve 13 is fastened to the body 11 by means of external threads 15 which mate with corresponding internal threads 16 formed in the body 11. Similarly, the sleeve 14 is fastened to the body 11 by means of external threads 17 which mate with corresponding internal threads 18 in the body 11. The sleeve 13 is formed to define a hollow cylinder 21 in which is disposed a piston indicated generally by the reference character 22. The piston 22 includes an outboard land 23 and an inboard land 24 each formed with a generally cylindrical outer surface which makes a sliding fit with the interior of the hollow cylinder 21. The lands 23 and 24 are connected to each other by a reduced diameter portion 25. Similarly, the sleeve 14 is formed to define a hollow cylinder 26 in which is disposed a piston indicated generally by the reference character 27. The piston 27 includes an outboard land 28 and an inboard land 29 each of which are formed to have substantially cylindrical outer surfaces which make a sliding fit with the interior of the cylinder 26. The lands 28 and 29 are interconnected by a portion 30 of reduced diameter. The piston 22 is formed to include a protrusion 32 extending axially from the inboard face of the land 24 and includes an annular collar 33. Similarly, the piston 27 includes a protrusion 34 extending axially from the inboard face of the land 29 and this protrusion is formed with an annular collar 35.

A torque motor 37 is mounted on the body 11 and includes an actuating arm 38 shown in its neutral position but which, in response to an input signal applied to the torque motor 37, is moved to the left or to the right, as viewed in the drawing, in accordance with the sense and magnitude of the input signal. The arm 38 is formed with a U shaped portion cut away so as to define a yoke having two fingers 41 and 42 which embrace the collars 33 and 35. The protrusions 32 and 34 are also formed with recesses in their facing surfaces which serve as seats for a compression spring 43 which resiliently urges the pistons 22 and 27 apart and at the same time urges the collars 33 and 35 into engagement with the fingers 41 and 42 respectively.

The housing 10 is formed to define a number of passageways each providing communication between the hollow cylinder 21 and the exterior of the housing. More particularly, the sleeve 13 is formed with generally radially extending passageways 45 and 46 each of which provides communication between the interior of the hollow cylinder 21 and the exterior of the sleeve. In the reference, or neutral, position of the parts shown in the drawing, the passageway 45 is just occluded by the land 24 but a slight movement of the piston 22 to the right will start to open this passageway. The passageway 46 opens into the cylinder in the region between the lands 23 and 24 and remains open for all positions of the piston 22. The sleeve 14 is formed to define similar passageways 47 and 48, the former of which is occluded by the land 29 in the neutral position but is opened by a slight movement of the piston 27 to the left. The passageway 48 is open to the interior of the cylinder 21 in the region between lands 28 and 29 and remains open for all positions of the piston 27. The valve body 11 is formed to define generally radially extending passageways 51, 52, 53, and 54 which register with the passageways 45, 46 47 and 48, respectively, and provide communication between these passageways and the exterior of the valve body 11. These registering passageways are the previously mentioned passageways in the housing 10 and provide communication between the interior and exterior thereof. Additionally, the valve body 11 is formed to define a centrally located passageway 55 which provides communication between the exterior of the body 11 and the interior of the bore 12 in the region between the sleeves 13 and 14. The left end of the hollow cylinder 21 is closed by means of a plug 57 threaded into the sleeve 13 while the right end is closed by means of a similar plug 58 threaded into the sleeve 14. The piston 22 is formed with a longitudinally extending passageway 61 which provides communication between the portions of the hollow cylinder 21 at opposite ends of the piston 22. Similarly, the piston 27 is formed with a generally longitudinally extending passageway 62 which provides communication between those portions of the hollow cylinder 21 which are at opposite ends of the piston 27.

In typical operation, the passageways 52 and 54 are both connected to a source of fluid under pressure while the passageways 51 and 53 are connected to external apparatus to be controlled such as a second stage valve. The passageway 55 is normally connected to the sump and an input signal is applied to the terminal 63 of the torque motor. In the absence of an input signal the actuating arm 38 is in the reference or neutral position shown and the spring 43 urges the collars 33 and 35 into engagement with the fingers 41 and 42 thereby positioning the pistons 22 and 27 in the neutral position shown. In this position, the passageways 45 and 47 are blocked by the lands 24 and 29, respectively, and no fluid flows into either of the passageways 51 or 53.

Let it be assumed that an input signal is applied to the torque motor 37 via the terminals 63 with such a sense as to displace the actuating arm 38 to the left. The finger 42 acting against the collar 35 will positively displace the piston 27 to the left thereby establishing fluid communication from the registering passageways 53 and 47, through the cylinder 26, to the registering passageways 48 and 54. It is to be noted that there is no direct actuation of the piston 22 at this time since the finger 41 moves away from the collar 33. The spring 43, which need only have sufficient force to hold the two collars against their respective fingers, will urge the piston 22 to the left. However, such movement does not alter any of the fluid connections. When the input signal is removed, the finger 41 acting against the collar 33 will urge the piston 22 back to the neutral position and the spring 43 now will urge the piston 27 back to the reference position. A comparable sequence of operations occurs with an input signal of the opposite sense which displaces the arm 38 to the right. It is to be noted that since the two pistons are urged into engagement with the fingers of the torque arm, backlash is eliminated without the need for close tolerances in manufacture. Although the fingers 41 and 42 have an arcuate, rather than a linear, motion, they may slide along the collars 33 and 35 sufficiently to prevent binding. In the position of the parts illustrated in the drawing, the passageways 45 and 47 are shown as being practically line on line with the faces of the lands 24 and 29 so that there is little or no dead space. However, it is simple matter to obtain more or less dead space simply by turning the sleeves 13 and 14 thereby shifting them axially to provide more or less overlap. They may be held in the desired positions by means of set screws 64 and 65. Similarly, the position of the sleeves 13 and 14 may be adjusted from time to time to compensate for wear of the edges of the lands 24 and 29. As shown, the passageways 46 - 48 and 51 - 55 are large enough to accommodate an ample range of adjustment of the sleeves 13 and 14 without losing registration.

From the foregoing description it will be apparent that the present invention provides a valve which can be manufactured without the need of adherence to strict tolerances yet one in which the neutral position and the amount of dead space (if any) can be adjusted easily to any desired value after the valve is assembled and which may be readjusted from time to time to compensate for wear of the lands.

It will be understood that certain portions of the valve, such as the torque motor, oil seals, oil grooves and the like have been shown only schematically or have been omitted entirely since they are well known and their details form no part of the present invention.

Although a preferred embodiment of the invention has been described in considerable detail for illustrative purposes, many modifications will occur to those skilled in the art. For example, although a three way valve has been described, the principles of the invention are equally applicalbe to a four way valve. Similarly, a valve in accordance with the invention can be used with a pressure feedback system in which case the passageways 61 and 62 would be replaced by passageways leading from the end spaces to the exterior of the valve body. Many other modifications can be made within the spirit of the invention. It is therefore desired that the protection afforded by Letters Patent be limited only by the true scope of the appended claims.

I claim:

1. A valve system including a housing formed to define a hollow cylinder, first and second separate pistons, each including a plurality of lands, disposed in opposite ends of said cylinder, said housing being formed to define first and second groups of generally radial passageways each providing communication between the interior of said cylinder and the exterior of said housing and cooperating with said first and second pistons respectively, a torque motor including an actuating arm and responsive to an input signal for displacing said arm in a first or a second direction in accordance with the sense and magnitude of said signal, said torque motor being disposed with said actuating arm extending within said hollow cylinder at approximately the axial midpoint thereof, resilient means for urging said pistons into engagement with said arm, whereby said arm and said resilient means cooperate to displace said pistons in response to said input signal and to return said pistons to their former positions in the absence of an input signal, characterized in that said valve system includes first means for adjusting the relative positions between said first group of passageways and said first piston without adjusting the relative positions between said second group of passageways and said second piston and second means for adjusting the relative positions between said second group of passageways and said second piston without adjusting the relative positions between said first group of passageways and said first piston in order to establish a reference position at which the lands of each piston are located symmetrically with respect to said passageways in the absence of an input signal.

2. A valve system in accordance with claim 1 in which the adjacent ends of each of said pistons is formed to define a radially extending collar and in which said arm is formed to define a yoke of such dimensions and so positioned as to embrace said collars leaving a space therebetween and in which said resilient means includes a spring for urging said pistons apart and said collars into engagement with said yoke.

3. A valve system in accordance with claim 1 in which said housing includes a valve body formed to define a generally cylindrical bore and also includes first and second sleeves axially aligned with each other and disposed within said bore and in which said passageways in said housing comprise first and second passageways in each of said sleeves and registering passageways in said body and in which said first and second means comprise means for adjusting the axial positions of said first and second sleeves respectively with respect to said valve body.

4. A valve system in accordance with claim 3 in which each of said pistons includes first and second lands positioned so that in said reference position said first land occludes said first passageway in its associated sleeve and so that said second passageway in its associated sleeve is located between said first and said second lands.

5. A valve system in accordance with claim 3 in which said first and second means for adjusting includes internal threads formed on the interior surface of said bore and includes mating external threads formed on the exterior surface of each of said sleeves, whereby rotation of either of said sleeves adjusts its axial position.

* * * * *